United States Patent
Östling et al.

(10) Patent No.: US 8,510,954 B2
(45) Date of Patent: Aug. 20, 2013

(54) SIMPLIFIED ROLLING BEARING UNIT AND A METHOD FOR MANUFACTURING SUCH A BEARING UNIT

(75) Inventors: Sture Östling, Katrineholm (SE); Franco Ollagnero, Almese (IT)

(73) Assignee: Aktiebolaget SKF, Göteborg (SE)

( * ) Notice: Subject to any disclaimer, the term of this patent is extended or adjusted under 35 U.S.C. 154(b) by 435 days.

(21) Appl. No.: 12/812,990

(22) PCT Filed: Dec. 17, 2008

(86) PCT No.: PCT/SE2008/000711
§ 371 (c)(1), (2), (4) Date: Jul. 15, 2010

(87) PCT Pub. No.: WO2009/091297
PCT Pub. Date: Jul. 23, 2009

(65) Prior Publication Data
US 2010/0290730 A1 Nov. 18, 2010

(30) Foreign Application Priority Data
Jan. 15, 2008 (SE) ........................ 0800084

(51) Int. Cl.
*B21D 53/10* (2006.01)
(52) U.S. Cl.
USPC .............. 29/898.063; 29/898.062; 29/898.13; 384/571
(58) Field of Classification Search
USPC ........... 29/898.062, 898.063, 898.13, 898.14; 384/571
See application file for complete search history.

(56) References Cited

U.S. PATENT DOCUMENTS 6,152,604 A * 11/2000 Ostling et al. ................ 384/478
2004/0016326 A1 1/2004 Liu

FOREIGN PATENT DOCUMENTS

| EP | 0967404 A2 | 12/1999 |
| EP | 1157776 A2 | 11/2001 |
| EP | 1158194 A2 | 11/2001 |
| JP | H0227526 U | 2/1990 |
| JP | H04333521 A | 11/1992 |
| JP | 200035035 A | 8/2001 |
| JP | 2002257145 A | 9/2002 |
| JP | 2003194081 A | 7/2003 |
| JP | 200444787 A | 9/2005 |
| WO | WO9737788 A1 | 10/1997 |
| WO | WO2008076011 A1 | 6/2008 |

* cited by examiner

*Primary Examiner* — David Bryant
*Assistant Examiner* — Ryan J Walters
(74) *Attorney, Agent, or Firm* — Bryan Peckjian; SKF USA Inc. Patent Department

(57) ABSTRACT

The invention refers to a bearing unit and a method for its manufacture incorporating an outer race ring (1), an inner race ring (4) having an inner envelope surface with an axially tapering saw-tooth profile (6), a thin-walled axially slotted sleeve (7), having a tapering saw-tooth profile (9) on its outer envelope surface, cooperating with the saw-tooth profile (6) in the inner race ring (4) for increasing and decreasing the grip of the thin-walled sleeve against a shaft, when inner race ring (4) and sleeve (7) are mutually displaced, a flange (10) connected to the sleeve (7) and having tightening means (11) operable to cause the displacement between sleeve (7) and inner race ring (4), rolling bodies (12) positioned between inner and outer race rings, wherein the surface of the inner race ring (4) presenting the tapering saw-tooth profile (6) has been subjected to a turning operation followed by hardening.

2 Claims, 1 Drawing Sheet

SIMPLIFIED ROLLING BEARING UNIT AND A METHOD FOR MANUFACTURING SUCH A BEARING UNIT

BACKGROUND OF THE INVENTION

The present invention refers to a simplified rolling bearing unit of the type referred to as an insert bearing unit, incorporating an outer race ring having a spherically curved outer envelope surface and a circumferential groove provided in the inner envelope surface, and an inner race ring having an outer envelope surface with a circumferential groove and an inner envelope surface with a tapering saw-tooth profile extending in the axial direction of the inner race ring, a thin-walled sleeve, which is slotted by means of an axially extending slot and has a tapering saw-tooth profile on its outer envelope surface, cooperating with the saw-tooth profile in the inner envelope surface of the inner race ring for increasing and decreasing the grip of the thin-walled sleeve against a shaft, when the inner race ring and the thin-walled sleeve are displaced axially relative to each other, a flange member being connected to the exterior of the thin-walled sleeve and provided with a tightening member operable to cause the mutual displacement between sleeve and inner race ring, the grooves in the outer and inner race rings being positioned in such a manner relative to each other so as to form together a race track for a number of balls positioned between the grooves.

Such a bearing unit is for instance disclosed in EP 0 967 404 A2, where the flange is provided with a set screw inserted in a bore having its axis inclined towards the axis of the inner race ring and having a front end engaging one side face of the inner race ring.

PCT/SE2006/001454 refers to a two-row spherical roller bearing wherein the inclined set screw is arranged to act against a loose thrust flange positioned between the end of the set screw and the inner race ring of the bearing, said loose thrust flange having a sloping side face facing the set screw, with such an inclination that the free end of the set screw acts perpendicularly against the surface of the loose thrust flange.

In both these bearings the saw-tooth profiled inner envelope surface of the inner race ring has been subjected to machining incorporating a finalizing grinding operation. The resulting bearing units have proven themselves to be efficient and reliable, although the manufacturing costs are rather high.

SUMMARY OF THE INVENTION

A purpose of the present invention is to propose a simplified rolling bearing unit of the type initially described, and which without being inferior in efficiency and reliability, can be produced at a substantially reduced cost, and this has been achieved in that the ball bearing unit has the features defined in this invention.

Another purpose of the invention is to propose a manufacturing method for production of such a simplified ball bearing unit.

BRIEF DESCRIPTION OF THE SEVERAL VIEWS OF THE DRAWINGS

Hereinafter the invention will be further described with reference to the accompanying drawings, schematically illustrating embodiments of the simplified ball bearing unit according to the invention.

DETAILED DESCRIPTION OF THE INVENTION

Figure 1:
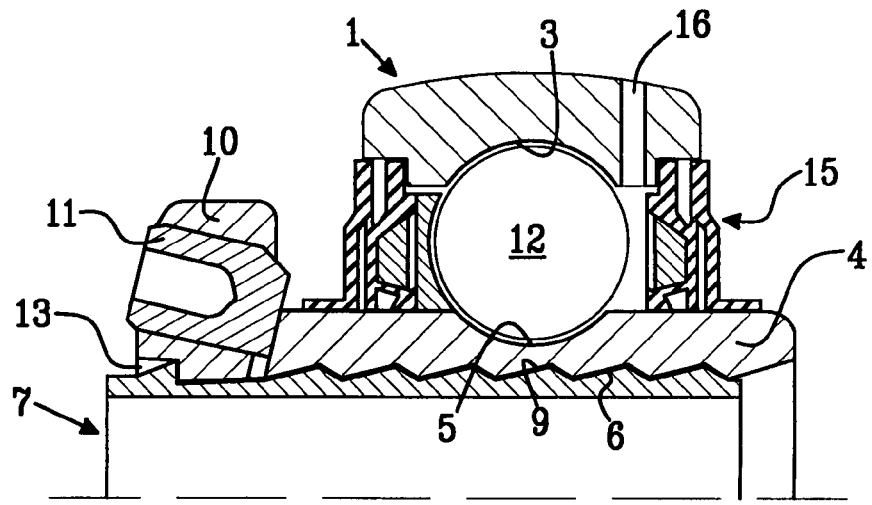
FIG. 1 is a schematic sectional view of a portion of an insert bearing unit according to the invention.

In FIG. 1 is shown, in a schematic longitudinal section, a portion of a bearing unit according to the invention, and incorporating an outer race ring 1 having a spherically curved outer inner envelope surface and a circumferential groove 3 provided in the inner envelope surface, and an inner race ring 4 having an outer envelope surface with a circumferential groove 5 and an inner envelope surface with a tapering saw-tooth profile 6 extending in the axial direction of the inner race ring, a thin-walled sleeve 7, which is slotted by means of an axially extending slot 8 (see FIG. 2) and has a tapering saw-tooth profile 9 on its outer envelope surface, cooperating with the saw-tooth profile 6 in the inner envelope surface of the inner race ring 4 for increasing and decreasing the grip of the thin-walled sleeve against a shaft (not shown), when the inner race ring and the thin-walled sleeve are displaced axially relative to each other, a flange member 10 being connected to the exterior of the thin-walled sleeve 7 and provided with a tightening member 11 operable to cause the mutual displacement between sleeve 7 and inner race ring 4, the grooves 3, 5 in the outer and inner race rings 1, 4 being positioned in such a manner relative to each other so as to form together a race track for a number of balls 12 positioned between the grooves.

In earlier embodiments of bearing units of this type the bore of the inner race ring has been subjected to hard machining terminated with a grinding operation.

Figure 2:
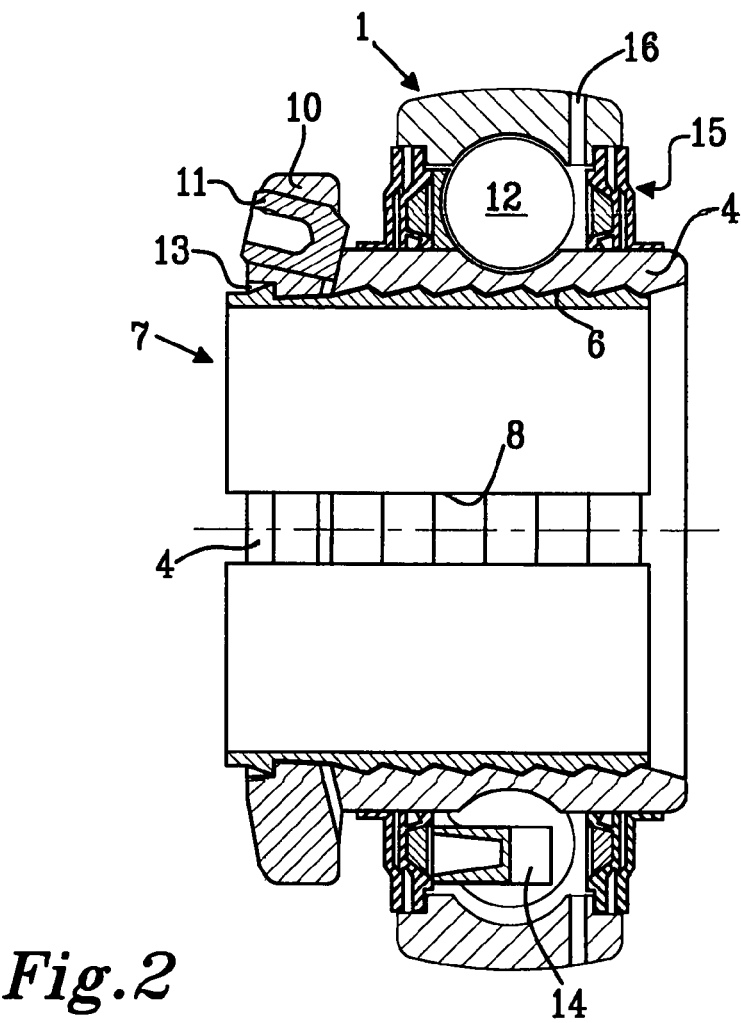
FIG. 2 is a cross section through a similar bearing unit in accordance with the present invention.

As can be seen in FIG. 2 the thin-walled sleeve 7 has a longitudinal slot 8, allowing the sleeve to be compressed when the sleeve 7 and the inner race ring are displaced relative to each other. The sleeve 7 is at one end provided with a radially outwardly projecting annular shoulder 13 adapted to engage in a recess in the side of the flange member 10 facing away from the bearing inner race ring 4, thereby forming a positive interconnection between sleeve 7 and flange member 10, thus that the longitudinal mutual displacement between the sleeve 7 and the inner race ring 4 is achieved when the tightening member 11 is tightened to introduce a force between sleeve and race ring. The balls 12 are preferably guided and spaced apart by means of a cage 14. The space between the outer race ring 1 and the inner race ring 4 at one or both sides of the bearing are sealed off by means of sealing devices 15, which can be either non-contacting and/or contacting seals. In the embodiment illustrated in FIG. 2, the outer race ring 1 is provided with a through-channel 16 intended for supply of lubricant to the interior of the bearing. This through-channel 16 is preferably provided with a not shown grease nipple.

According to the present invention, the inner race ring of the bearing is designed, manufactured and treated in order to give a black ring, where the multi-step profile is ready to use, whereby this part will not be subjected to any further grinding operation. The bore of the inner race ring of the bearing, and the saw-tooth profile therein, is produced by soft turning, whereupon at least the inner surface portion of the inner race ring is subjected to hardening, which will allow to minimize the inner ring distortion, especially in the bore. Such hardening can preferably be performed by induction hardening, although it is also possible to subject the inner race ring 4 to a through hardening operation. By this method a black ring is produced, due to the fact that the ring is not ground anymore after the hardening operation, and it has been established that the quality of the saw-tooth-shaped surface of the bore of the inner race ring is sufficient for cooperation with the corresponding saw-tooth profile in the outer envelope surface of the thin-walled sleeve 7, and without need for the finalizing grinding operation which has earlier been applied to the bore surface.

The use of a black inner race ring and a conventional sleeve is a different and non-conventional matching of profiles, which will enable to obtain a unique performing clamping on a shaft due to the combined stiffness and tolerance of the inner race ring and the sleeve.

With such a modified manufacturing method, the manufacturing cost has been reduced with between 25 and 30%.

The invention is not limited to the bearing illustrated in the drawing, and described in connection thereto, but variants and modifications are possible within the scope of the claims attached hereto.

The invention claimed is:

1. A method for manufacturing a bearing unit comprising the steps of:

providing an outer race ring, an inner race ring having an inner envelope surface with a tapering saw-tooth profile extending in an axial direction of the inner race ring, a thin-walled sleeve having an axially extending slot and a tapering saw-tooth profile on an outer envelope surface, the sleeve saw tooth profile being configured to engage with the saw-tooth profile in the inner envelope surface of the inner race ring, a flange member connected to the exterior of the thin-walled sleeve, and a tightening member disposed within the flange and configured to displace at least one of the sleeve and the inner race ring with respect to the other one of the sleeve and the inner race ring, subjecting the surface of the inner race ring to a soft turning operation, and subjecting at least a surface layer of the inner race ring facing the sleeve to an induction hardening operation.

2. A method for manufacturing a bearing unit comprising the steps of: providing an outer race ring, an inner race ring having an inner envelope surface with a tapering saw-tooth profile extending in an axial direction of the inner race ring, a thin- walled sleeve having an axially extending slot and a tapering saw-tooth profile on an outer envelope surface, the sleeve saw tooth profile being configured to engage with the saw-tooth profile in the inner envelope surface of the inner race ring, a flange member connected to the exterior of the thin-walled sleeve, and a tightening member disposed within the flange and configured to displace at least one of the sleeve and the inner race ring with respect to the other one of the sleeve and the inner race ring, subjecting the surface of the inner race ring to a soft turning operation, and subjecting at least a surface layer of the inner race ring facing the sleeve to a through hardening operation.

* * * * *